S. E. ROSS.
CLUTCH.
APPLICATION FILED JUNE 11, 1909.
979,703.
Patented Dec. 27, 1910.
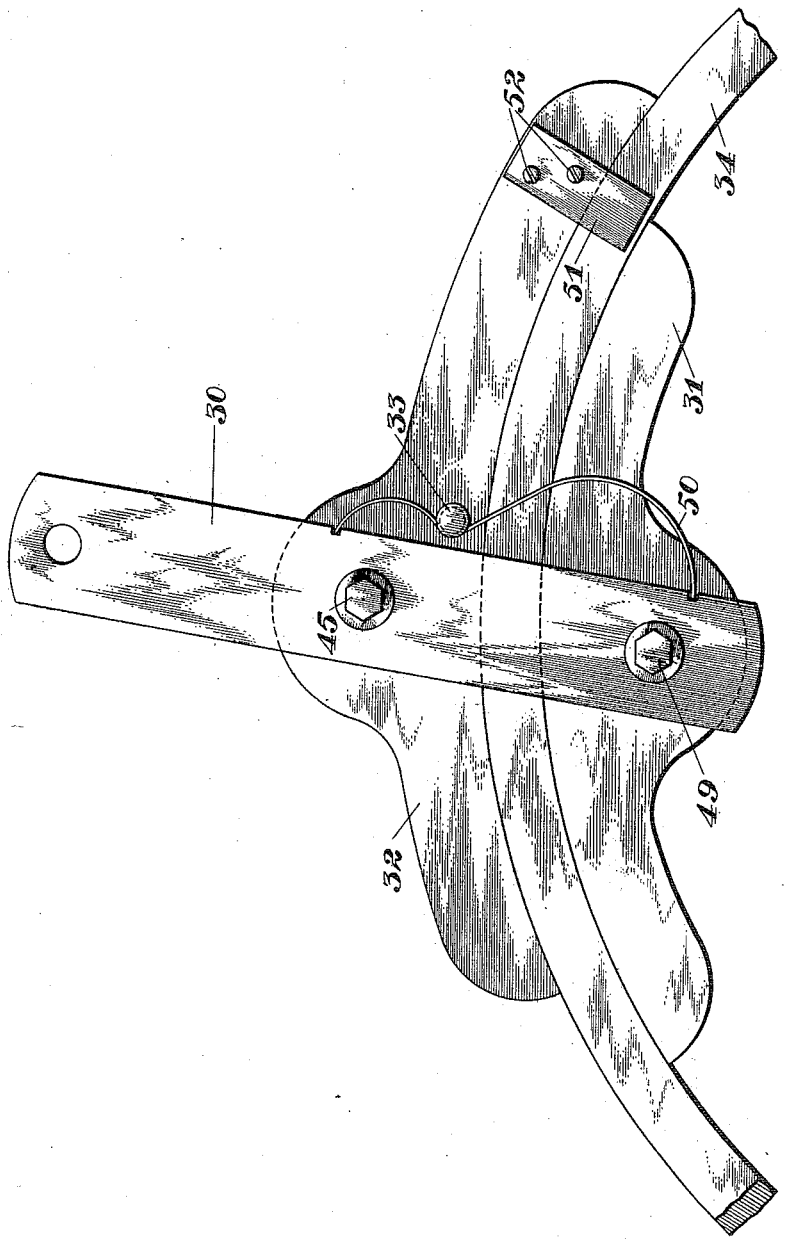
Witnesses:
A. Y. Trogdon
Ida Trogdon
Inventor
Samuel E. Ross.

UNITED STATES PATENT OFFICE.

SAMUEL E. ROSS, OF PARIS, ILLINOIS.

CLUTCH.

979,703.          Specification of Letters Patent.     Patented Dec. 27, 1910.

Application filed June 11, 1909. Serial No. 501,661.

*To all whom it may concern:*

Be it known that I, SAMUEL E. ROSS, a citizen of the United States of America, residing at No. 1207 South Main street, in the city of Paris, in the county of Edgar and State of Illinois, have invented a new and useful Improvement in Clutches; and I do hereby declare the following to be a full and clear description of my invention, such as will enable others skilled in the art to which it appertains to make and use the same.

My invention relates to improvement in an intermittent grip device, generally called a clutch, which is operated by means of power applied to the lever of said clutch, which is mounted on a perfectly smooth surface of a circular upright flange.

The object of my invention is to drive machinery, carry loads, and to stop the movement at any point. I attain this object by the mechanism illustrated in the accompanying drawing, which is a plan view of the clutch mounted on a section of a circular upright flange.

The lever 30 is connected by a cap screw 45 to the outside shoe of the clutch, and by cap screw 49 to the inside shoe 31 as shown in the drawing. The clutch is made of two shoes, one, 31, is placed with its convex surface on the inside of the flange 34, and the other 32 with its concave surface against the outside of the flange 34 on casting; the lever 30 is pivotally connected to said shoes by the cap screws 45 and 49; a curved spring 50 is placed between pin 33, in shoe 32, and the lever 30 to keep the inside shoe, 31 in advance of 32. The curved spring 50 reaching across the shoes 31 and 32, fits in a notch in pin 33, and the ends of said spring fit in notches in the lever. The pin 33 acts as a safety in case the spring should break, and it keeps the inner shoe from dropping back, and prevents it from catching in the reverse motion. A bar support 51 is bolted to the rear end of shoe 32 at 52, and rests on the top of the circular flange 34 to keep the shoe up in proper position. When the lever 30 is thrown forward, the clutch moves forward on the circular upright flange with but little noise and friction, and when the lever is reversed the clutch grips the flange.

The inner edge of the shoes may be made straight for use on a beam or straight flange.

Having thus described my invention, I claim:

The combination in a clutch of a lever, two shoes pivotally mounted on said lever, the outer shoe having a concave inner surface and the inner shoe having a convex outer surface, a circular upright flange engaged by the surfaces of said shoes, a bar support secured to the outer shoe at one end and extending over the upright flange, a pin in the outer shoe near the lever, and a curved spring between the pin and the lever.

In testimony whereof I affix my signature in the presence of two witnesses this 7 day of June, 1909.

SAMUEL E. ROSS.

Witnesses:
    IDA TROGDON,
    A. Y. TROGDON.